Patented Aug. 5, 1924.

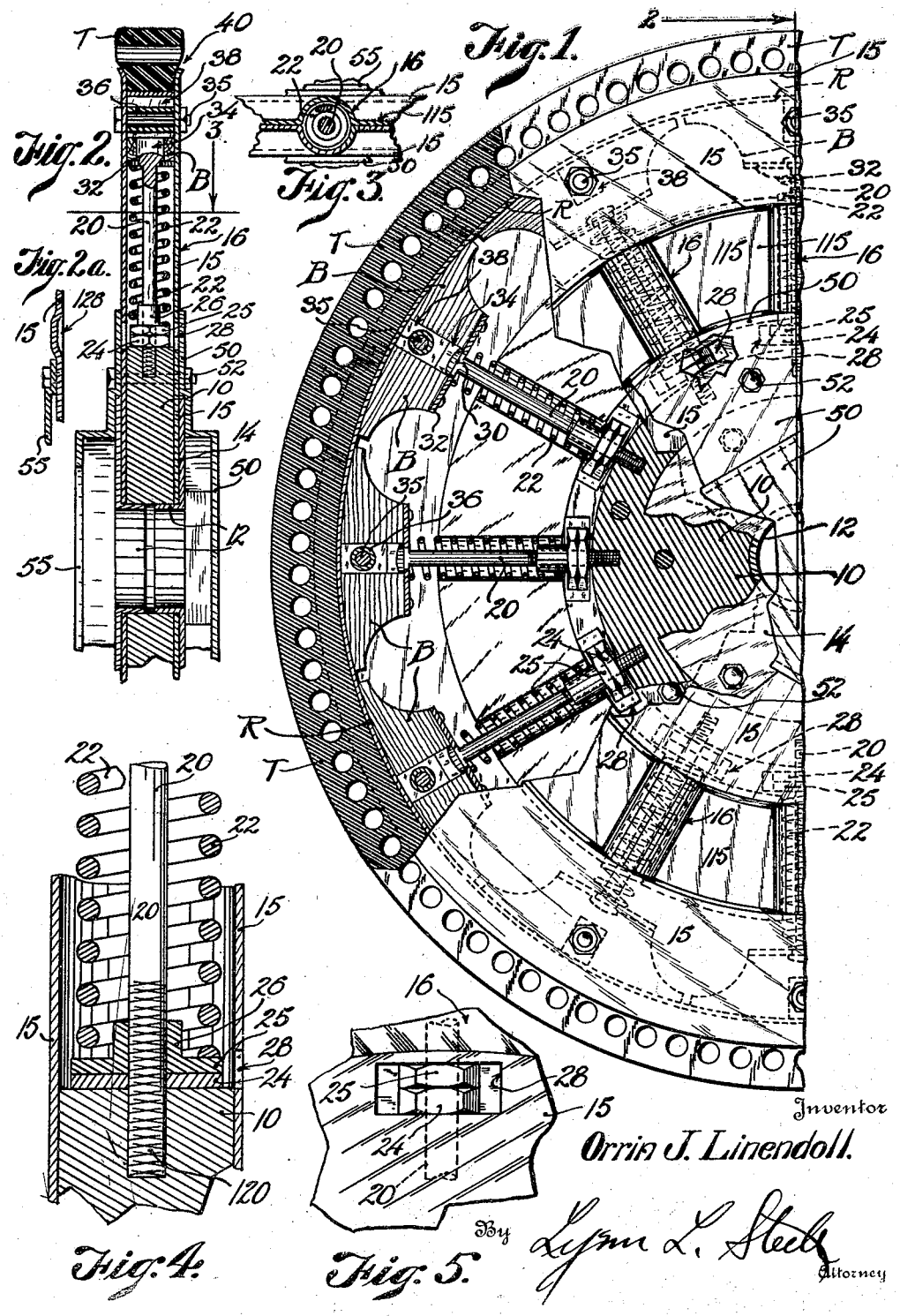

1,503,593

UNITED STATES PATENT OFFICE.

ORRIN J. LINENDOLL, OF DENVER, COLORADO.

SPRING WHEEL.

Application filed July 25, 1921. Serial No. 487,433.

*To all whom it may concern:*

Be it known that I, ORRIN J. LINENDOLL, a citizen of the United States, residing at the city and county of Denver and State of Colorado, have invented certain new and useful Improvements in Spring Wheels; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to provide a resilient wheel which shall be comparatively simple and cheap in construction, positive and highly efficient in operation, and strong and durable. The present device is an improvement upon that disclosed in the patent to Million issued November 12, 1918, Patent No. 1,284,416.

Briefly the invention comprises a hub block enclosed between two discs connected therewith and a plurality of spokes positioned radially upon the hub block, each spoke carrying at its outer end a movable shoe and having around it a spring bearing against the shoe and adapted to have the tension thereof adjustable for varying loads. The discs are so pressed or otherwise formed as to provide jointly a cylinder for each spring and spoke thereby positively positioning the springs. The shoes which are movable radially of the wheel are slotted for receiving bolts and spacers which maintain the relation of the outer portions of the discs and position the shoes with respect thereto. A steel band on which is vulcanized a solid tire rests upon the shoes between the discs while the tread of the tire projects beyond the periphery of the discs. Adjustment of the springs is obtained by means of nuts on the spokes and one disc is slotted opposite each nut for introduction of a wrench, the flange of a hub cap normally covering the slots.

In the drawings—

Fig. 1 is a partial elevation showing the invention, portions being broken away to show the internal construction;

Fig. 2 is a cross section indicated by the line and arrow 2 of Fig. 1; Fig. 2ª is a modified detail;

Fig. 3 is a cross section taken on the line 3 of Fig. 2;

Fig. 4 is an enlarged fragmentary detail of a part of Fig. 2; and

Fig. 5 is an enlarged elevational detail.

The wheel comprises a hub block 10 at whose center hub members 12 are adapted to be positioned for the purpose of receiving axle bearings in the usual or other manner. The flanges of these members 12 are adapted to overlie the inner portions of the discs 15 as indicated at 14, said flanges 14 being secured to the hub block 10 as desired. The discs 15 are the chief supporting elements of the wheel and maintain the relation of the various parts.

The discs 15 are depressed at regular intervals as indicated at 115 and a semi-cylindrical spoke and spring receiver 16 is formed on each disc 15 between the depressions 115, so that the two discs 15 when assembled provide between them a plurality of cylindrical chambers for said spokes 20 and their springs 22 which are disposed thereabout. The inner end of each spoke 20 is threaded into the block 10. A lock nut 24 and an adjusting nut 25 having a spring positioning sleeve 26 are threaded onto each spoke 20 just beyond the block 10, so that the tension of the spring 22 may be varied as desired by turning nut 25 and the adjustment secured by lock nut 24. As clearly indicated in Fig. 4 the inner end of each spoke is double threaded at 120 and the nuts 24 and 25 are oppositely threaded so as to insure the locking function. Just within the inner end of each housing or receiver 16 on one of the discs 15 a slot 28 is provided for introduction of a wrench to adjust the nuts 24 and 25, these slots 28 thus being in the central flat portion of the disc which lies in the same plane as the peripheral portion beyond the housings 16. The outermost portion of each housing 16 also lies in said plane for convenience in manufacture and for greater strength and rigidity. The nuts 24 and 25 may if desired be somewhat larger in greatest dimension than the width of the space between the discs in which instance both discs may be slotted at 28 to provide for passage of the corners of the nuts, or the back plate or disc 15 may be offset as indicated at 128, Fig. 2ª, for the same purpose. Again no slots need be provided in the back disc as seen in Fig. 4. The hub cap 50, which may be secured in place by means of bolts 52 which connect the discs 15 and the hub block 10, has its flange sufficiently extended to cover the slots 28 when said cap is in operative position. If slots 28 are provided in the back disc 15, a brake drum 55, for instance, which may also be retained by bolts 52, may have a flange to cover said slots.

The outer end of each spoke 20 carries a shoe or block B which shoes collectively form a sectional inner rim on which an endless steel band or rim R is carried. The band R preferably has a solid tire T vulcanized thereon which may be perforated transversely in known manner as shown. The shoes B are movable radially along their spokes 20, and the outer end of each spoke is provided with a squared head 30, a portion of which is smaller and seats in as square opening in the bearing plate 32 of each block, and a portion of which head 30 is larger and works in a radial passage 34 in the shoe or block. The enlarged portion of the head 30 positively prevents withdrawal from the plate 32, the squared feature prevents turning of the spoke 20 during adjustment of the nuts 24 and 25, and the plate 32 provides a bearing for the outer end of the respective spring 22 against which the respective shoe B works. The relation of the shoes B to one another is maintained by means of bolts 35 which carry spacing sleeves 36 disposed in slots 38 in the shoes B beyond the radial passages 34. The bolts 35 and spacers 36 also serve the purpose of maintaining the positions of the discs 15 in which said bolts are secured, and act to limit the inward movement of the band R.

In order to prevent the working of grit and the like in between the edges of the discs 15 and the tire T, said edges are preferably slightly rolled outward as shown and the tire T tapered on each side (Fig. 2) so that when weight is thrown on the tire when a given portion engages the road bed the tire will be crowded in between the discs and grit effectually excluded.

From the foregoing it will be seen that I have provided a resilient wheel in which the tension of the springs employed may be readily adjusted for varying loads, wherein the relation of the parts, including the springs and spokes, is positively maintained, which will resist great side strain, is highly efficient in operation, and comparatively simple and cheap.

I claim:

1. A spring wheel comprising a hub block, a plurality of spokes carried thereby, springs disposed about said spokes, means on the spokes for adjusting the tension of said springs, and shoes movable relatively to one another on the outer ends of said spokes, said spokes having heads positioned in said shoes to prevent turning of the spokes during adjustment.

2. A spring wheel comprising a pair of spaced discs, a hub block therebetween, a plurality of spokes carried thereby, a spring about each spoke, and cylindrical housings formed by semi-cylindrical housings in each of said spaced discs receiving said spokes and springs, and rim mechanism at the outer ends thereof, the housings in each disc being semi-cylindrical throughout their lengths.

3. A spring wheel comprising a pair of discs, a hub block therebetween, a plurality of spokes carried thereby, a spring about each spoke, adjusting mechanism at the inner end of each spoke for adjusting the tension of the respective spring, one of said discs having a slot therein opposite the adjusting mechanism for each spring, and rim mechanism at the outer ends of the spokes and springs.

4. A spring wheel comprising a pair of discs, hub means therebetween, a plurality of spokes carried thereby, a spring about each spoke, adjusting mechanism at the inner end of each spoke for adjusting the tension of the respective spring, one of said discs having a slot therein opposite the adjusting mechanism for each spring for access thereto, a hub cap having a projecting portion covering each of said slots normally, and rim mechanism at the outer ends of said spokes and springs.

5. A spring wheel comprising a pair of discs, hub means therebetween, a plurality of spokes carried thereby, a spring about each spoke, rim mechanism at the outer ends of said spokes lying between said discs at their peripheral portions, the hub and peripheral portions of each disc being in the same plane and the intermediate portion being depressed and shaped to form in each disc a plurality of semi-cylindrical housings opposite like housings in the other disc for enclosing said springs, the outermost portion of each housing lying in the plane of said peripheral and hub portions.

6. A spring wheel comprising a pair of discs, hub means therebetween, a plurality of spokes carried thereby, a spring about each spoke, adjusting means at the inner end of each spoke for adjusting the tension of the respective spring, rim mechanism at the outer ends of said spokes and springs and positioned between the peripheral portions of said discs, the hub and peripheral portions of each disc being in the same plane and the intermediate portion being depressed to form a housing for each spring, one disc having openings therein opposite the adjusting mechanism for each spring for access thereto.

7. A spring wheel comprising a pair of discs, a hub block therebetween, a plurality of spokes fixed in said block, a spring about each spoke, adjusting means on the inner end of each spoke to vary the tension of the spring, rim mechanism on the outer ends of the spokes, and cylindrical housings for said springs, said housings being formed by semi-cylindrical housings in each disc mating with like housings in the other disc, said semi-cylindrical housings being semi-cylindrical throughout their length.

8. A spring wheel comprising a pair of discs, spokes therebetween having springs thereon, movable rim sections on the outer ends of the spokes, each section having a radial slot, a bolt passing through each slot and carried by the discs, and a tire band about said sections whose inward movement is limited by said bolts which are adapted to be engaged thereby.

9. A spring wheel comprising a pair of spaced discs, movable rim sections between said discs, yielding means between said discs and engaging the inner portions of said sections, each section having a radial slot therein, a bolt passing through each slot and carried by the discs, and a tire band about said sections whose inward movement is limited by said bolts.

In testimony whereof I affix my signature.

ORRIN J. LINENDOLL.